R. G. ORVIN.
SAP GATHERER.
APPLICATION FILED NOV. 15, 1915.

1,283,878.

Patented Nov. 5, 1918.

Inventor
R. G. Orvin

Witnesses
Chas. H. Trotter

By ____ Attorney

UNITED STATES PATENT OFFICE.

RANSOM G. ORVIN, OF BROMLEY, ALABAMA.

SAP-GATHERER.

1,283,878. Specification of Letters Patent. Patented Nov. 5, 1918.

Application filed November 15, 1915. Serial No. 61,565.

*To all whom it may concern:*

Be it known that I, RANSOM G. ORVIN, a citizen of the United States, residing at Bromley, in the county of Baldwin and State of Alabama, have invented certain new and useful Improvements in Sap-Gatherers; and I do hereby declare the following to be a full, clear, and exact description of the invention, such as will enable others skilled in the art to which it appertains to make and use the same.

This invention has for its primary object to provide a simple and efficient device particularly designed for facilitating the gathering or collection of sap exuded during certain seasons from trees.

With this and other objects in view, the invention consists in the novel construction, arrangement and formation of parts as will be hereinafter specifically described, claimed and illustrated in the accompanying drawing, in which:

Figure 1:
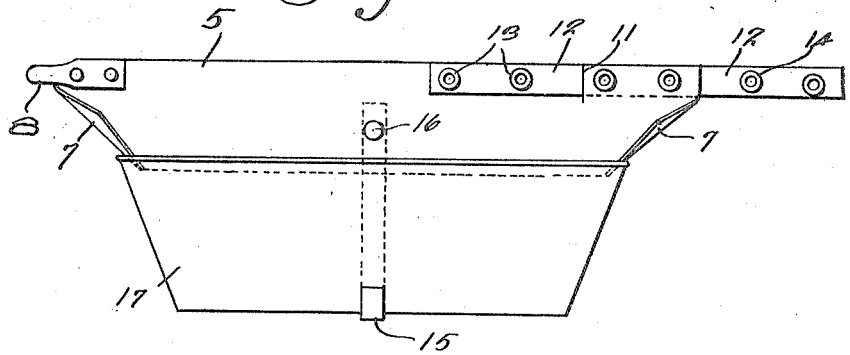
Figure 1 represents a fragmental front elevation of the sap gatherer.
Figure 2:
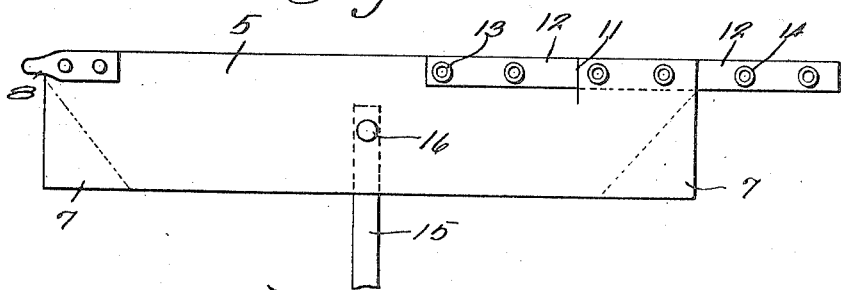
Fig. 2 represents a plan view of the body plate of the gatherer removed.
Figure 3:
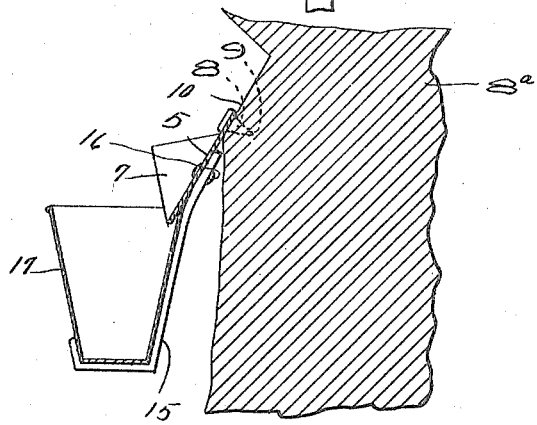
Fig. 3 represents a vertical sectional view through the gatherer, as applied to use.

Referring to the drawing in detail, wherein similar reference numerals designate corresponding parts throughout the several views, the numeral 5 indicates the body plate or strip of the gatherer which is formed of flexible non-corrosive sheet metal, having the lower corners 7 thereof directed outwardly for conducting the sap into a receptacle to be hereinafter described.

A supporting hook 8 is permanently secured to one end of the plate 5 and is formed with a laterally and inwardly directed beak 9, having a pointed terminal adapted to penetrate into the bark of the tree $8^a$ adjacent the cut 10 formed therein. Adjacent the opposite end of the body plate 5 a slit 11 is formed in the upper longitudinal edge thereof and receives the medial portion of a flexible supporting strap 12, which latter is secured to the body plate 5 upon opposite sides of the slit 11 by rivets or equivalent means 13. The free end of the strip 12 is formed with apertures 14 adapted to receive nails, or other similar fasteners, driven into the tree $8^a$ on the side of the cut 10 opposite the hook 8. A depending angular supporting member or bracket 15 is secured at 16 to the rear surface and adjacent the center of the body plate 5 upon which is supported a sap-receiving receptacle 17. The lower edge of the inclined body plate 5 projects into the upper open end of the receptacle 17.

In use, the sap gatherer is secured in operative position upon the tree $8^a$ over or below the cut 10 therein by engaging the penetrating end of the hook 8 in the bark of the tree at one side of the cut 10 and securing the strap 12 on the opposite side of the cut by driving nails, or equivalent means through the apertures 14 and into the tree $8^a$. The body plate is disposed at an inclination so that the sap exuded from cut 10 will flow over the plate and into the receptacle 17, which latter may be removed from the supporting member 15 when full and emptied.

What I claim is:

A sap gatherer comprising an elongated body having its lower edges bent angularly to define draining grooves and flanges to said body, an attaching strip secured to one end of said body and along the upper longitudinal edge thereof, a right angled bill formed on said strip and adapted to be driven in one side of a tree, said body having a slot adjacent the end remote from the strip and opening outwardly through the upper longitudinal edge thereof, a second strip of considerable length extending through said slot so as to overlie each face of the body along the upper longitudinal edge thereof, means securing the second strip to the faces of the body, means securing the outer free end of the second strip to the other side of the tree, and means supporting a receptacle to the body between the grooves and flanges.

In testimony whereof I affix my signature in presence of two witnesses.

RANSOM G. ORVIN.

Witnesses:
THOMAS J. DIXON,
WILLARD F. SIBLEY.

Copies of this patent may be obtained for five cents each, by addressing the "Commissioner of Patents, Washington, D. C."